Patented Sept. 15, 1931

1,822,974

UNITED STATES PATENT OFFICE

LEOPOLD LASKA AND ARTHUR WERDERMANN, OF OFFENBACH-ON-THE-MAIN, GERMANY, ASSIGNORS TO GENERAL ANILINE WORKS, INC., OF NEW YORK, N. Y., A CORPORATION OF DELAWARE

META-HYDROXY-DIPHENYLAMINE COMPOUNDS AND PROCESS OF MAKING SAME

No Drawing. Application filed June 13, 1930, Serial No. 461,046, and in Germany June 24, 1929.

The present invention relates to meta-hydroxy-diphenyl-amine compounds and to a process of making same.

These new compounds correspond to the general formula:

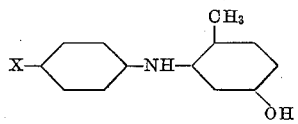

wherein X stands for hydrogen, methyl or chlorine. They are valuable intermediates for the production of dyestuffs. The process in accordance with the present invention comprises heating 1-methyl-2-amino-4-hydroxy-benzene of the formula:

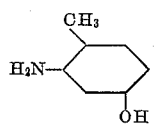

with an arylamine of the formula:

(wherein X has the above signification) in the presence of hydrochloric acid or agents delivering same.

It could not be foreseen that the amino-group of the amino-cresol used would react with the arylamine. It was much more to be expected that the hydroxy-group would react and that a diphenylamine free from hydroxy-groups would be formed, since a group standing in para-position to the methyl-group is known to be more reactive than an amino-group standing in ortho-position. In meta-toluylene-diamine for instance only the para-standing amino-group is capable of being substituted by aromatic residues (see German Patent No. 80977) or of being condensed with resorcinol (see German Patent No. 82640). These instances prove the inactivity of the amino-group standing in ortho-position to the methyl-group.

In order to further illustrate our invention the following examples are given, the parts being by weight and all temperatures in centigrade degrees, but it is however to be understood, that our invention is not limited to the particular products nor reacting conditions mentioned therein.

Example 1

300 parts of 1-methyl-2-amino-4-hydroxy-benzene, 360 parts of aniline-hydrochloride and 360 parts of aniline are mixed together and the mixture is heated while stirring to 210–215° for 8 hours. Thereafter it is rendered alkaline by means of caustic soda lye and freed from the excess of aniline by means of steam. From the filtered remaining solution a viscous light brown oil is separated by the addition of hydrochloric acid. It is purified by distillation in vacuo; it passes over at about 255° under a pressure of 20 mm. It represents 3-hydroxy-6-methyl-diphenylamine of the formula:

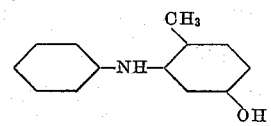

Example 2

300 parts of 1-methyl-2-amino-4-hydroxy-benzene, 522 parts of para-toluidine and 240 parts of hydrochloric acid of 24° Bé. are heated together to 210° for 8 hours. Then the mass is rendered alkaline and freed from the formed ammonia and the unchanged para-toluidine. The filtered remaining solution yields by acidification with hydrochloric acid 3-hydroxy-6.4'-dimethyl-diphenylamine of the formula:

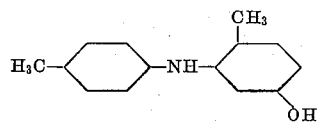

Example 3

300 parts of 1-methyl-2-amino-4-hydroxy-benzene, 900 parts of para-chloroaniline, 225 parts of hydrochloric acid of 24° Bé. and 900 parts of ortho-dichlorobenzene (acting as diluent) are heated together to 180–190° for 15 hours. Then the mass is rendered alkaline with caustic soda lye, the formed ammonia and the ortho-dichloro-benzene are removed, the excess of para-chloroaniline is extracted with dilute hydrochloric acid and the residue is dissolved in dilute caustic lye. By precipitating the filtered solution with hydrochloric acid 3-hydroxy-6-methyl-4'-chloro-diphenyl-amine of the formula:

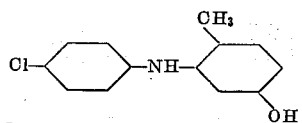

is obtained.

We claim:

1. Process which comprises heating 1-methyl-2-amino-4-hydroxy-benzene with an arylamine of the general formula:

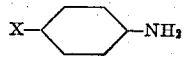

(wherein X stands for hydrogen, methyl or chlorine) in the presence of hydrochloric acid which may be applied in situ.

2. Process which comprises heating 1-methyl-2-amino-4-hydroxy-benzene with aniline in the presence of hydrochloric acid which may be applied in the form of aniline-hydrochloride.

3. As new compounds the meta-hydroxy-diphenylamine compounds of the general formula:

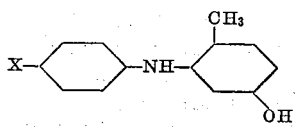

(wherein X stands for hydrogen, methyl or chlorine), which compounds are oily to solid substances soluble in caustic alkalies.

4. As a new compound the 6-methyl-3-hydroxy-diphenyl-amine of the formula:

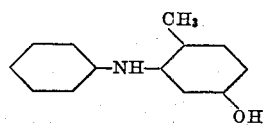

which compound in an oily substance boiling at about 255° under a pressure of 20 mm., soluble in caustic alkalies.

In testimony whereof, we affix our signatures.

LEOPOLD LASKA.
ARTHUR WERDERMANN.